United States Patent
Kolesnikov (10) Patent No.: US 8,943,331 B2
(45) Date of Patent: Jan. 27, 2015

(54) PRIVACY-PRESERVING DATABASE SYSTEM

(71) Applicant: Vladimir Y Kolesnikov, Jersey City, NJ (US)

(72) Inventor: Vladimir Y Kolesnikov, Jersey City, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 155 days.

(21) Appl. No.: 13/729,619

(22) Filed: Dec. 28, 2012

(65) Prior Publication Data

US 2014/0189364 A1    Jul. 3, 2014

(51) Int. Cl.
  *G06F 11/30*   (2006.01)
  *G06F 12/14*   (2006.01)
  *G06F 21/62*   (2013.01)

(52) U.S. Cl.
  CPC ........ *G06F 12/1408* (2013.01); *G06F 21/6218* (2013.01)
  USPC ....................................................... 713/189

(58) Field of Classification Search
  CPC .. G06F 21/72; G06F 21/10; G06F 2221/2107
  USPC ....................................................... 713/189
  See application file for complete search history.

(56) References Cited

U.S. PATENT DOCUMENTS 7,908,374 B2 * 3/2011 Takase et al. ................. 709/226
7,962,951 B2 * 6/2011 Takase et al. ..................... 726/2
2002/0025043 A1   2/2002 Feng et al.
2014/0068259 A1 * 3/2014 Resch et al. .................. 713/167
2014/0068320 A1 * 3/2014 Vedpathak et al. ............ 714/6.2
2014/0068791 A1 * 3/2014 Resch ............................. 726/30

FOREIGN PATENT DOCUMENTS

WO PCT/US2013/076255    2/2014

OTHER PUBLICATIONS

Rafail Ostrovsky et al: "A Surevy of Single-Database Private Information Retrieval: Techniques and Applications", Apr. 16, 2007, Public Key Cryptography A PKC 2007; [Lecture Notes in computer Science; LNCS], Springer Berline Heidelberg, Berlin, Heidelberg, pp. 383-411, XP047029621, ISBN: 978-3-540-71676-1 Secion 2; p. 399-p. 403public key cr.

* cited by examiner

*Primary Examiner* — Teshome Hailu
(74) *Attorney, Agent, or Firm* — A. Ralston (57) ABSTRACT

A database system includes a server, index server and client. In one embodiment the server randomly permutes the order of database records. The server provides to the index server an array of encryption keys by generating a random encryption key corresponding to each permuted database record. The server encrypts each permuted database record with its corresponding encryption key. The index server computes and encrypts a sum of each encryption key and a corresponding random mask and sends a permuted array of masked keys to the server. The index server provides to the client an encrypted database record, and the mask and key corresponding to the encrypted record. The client sends the encrypted sum of the mask and key to the server. The server decrypts the masked key with a public key and sends the decrypted key to the client. The client then recovers the record key and decrypts the record.

13 Claims, 8 Drawing Sheets

PRIVACY-PRESERVING DATABASE SYSTEM

STATEMENT REGARDING FEDERALLY SPONSORED RESEARCH OR DEVELOPMENT

This invention was made with government support under contract no. D11PC20194 awarded by Intelligence Advanced Research Projects Activity (IARPA). The government has certain rights in the invention.

TECHNICAL FIELD

The disclosure relates generally to the field of secure storage and retrieval of information.

BACKGROUND

Sometimes when a client retrieves data from a database, it is desirable that the retrieved data and the query itself be unviewable by (i.e. hidden from) an intermediate entity, e.g. a database server and, if present, any auxiliary services. Various methods have been devised to shield the data from the server, but suffer from, for example, significant computational overhead. Moreover, current solutions may not adequately protect a client query from inspection, thereby providing a malicious entity the opportunity to determine the information provided to the client.

Consequently, a solution is needed for providing improved secure retrieval of data from a database that addresses the aforementioned deficiencies.

SUMMARY

In one embodiment, the disclosure provides a database server. The server includes a processor and a memory. The memory is accessible by the processor and includes a plurality of database records. The processor is configured to communicate over a network with an index server, e.g. an auxiliary noncolluding server. The processor is configured to at least pseudorandomly permute the order of the database records, thereby producing a permuted database. The processor may generate an at least pseudorandom encryption key corresponding to each permuted database record, thereby producing an encrypted key array. Each permuted database record may be encrypted with its corresponding encryption key. The processor is configured to store the permuted database records and the at least pseudorandom encryption keys in the memory.

In any embodiment of the database server the processor may be further configured to generate a public-private key pair and to homomorphically encrypt each of the pseudorandom encryption keys using the key pair, e.g. the public key. In any embodiment the processor may be further configured to receive an array of encryption keys, which may be masked, and to decrypt and store the decrypted encryption keys. In any embodiment the processor may be configured to decrypt an encrypted key received from the index server and to transmit a resulting decrypted key, e.g. to a client. In any embodiment the processor may be configured to send the permuted database and the encrypted key array to an auxiliary noncolluding server.

In another embodiment the disclosure provides a database index server. The index server includes a processor and a memory accessible by the processor. The memory includes program instructions executable by the processor to provide communication over a network between the processor, and a client and a database server. The processor is configured to receive an array of encryption keys that may be encrypted. The processor may generate an at least pseudorandom mask corresponding to each key in the array. The processor may compute and encrypt a sum of each encryption key and the mask corresponding to that key.

In any embodiment of the index server the processor may be further configured to at least pseudorandomly permute the order of the encrypted sums to produce a permuted array of masked keys. In some embodiments the sum is encrypted homomorphically. In any embodiment the processor may be further configured to receive an array of data records from a database server. In such embodiments the processor may be further configured to receive a record number from a client, and to return to the client a data record and a mask corresponding to the record number. In any embodiment of the index server each record of the array of data records may be encrypted.

Another embodiment provides a database client. The client includes a processor and a memory. The memory is accessible by the processor and includes program instructions executable by the processor to receive from an index server a database record, a mask and a corresponding key. The processor is configured to compute and encrypt a sum of the key and the mask, and send the encrypted sum to a database server.

In any embodiment of the database client the key may be a masked key, and the processor may be further configured to receive from the server a decrypted key corresponding to the masked key. In any such embodiment the processor may be further configured to subtract the mask from the received decrypted key. In any such embodiment the processor may be further configured to decrypt the received database record using the decrypted key.

Another embodiment provides a method of operating a database server. The method includes at least pseudorandomly permuting the order of database records stored by the server. An at least pseudorandom encryption key is generated that corresponds to each permuted database record. Each permuted database record is encrypted with its corresponding encryption key.

Another embodiment provides a method of operating a database index server. The method includes receiving an array of encryption keys that may be encrypted. An at least pseudorandom mask is generated that corresponds to each key in the array. An encrypted sum is computed of each encryption key and the mask corresponding to that key.

Yet another embodiment provides a method of operating a database client. The method includes querying an index server for a database record, a mask and a key corresponding to a record number. A sum of the key and the mask is computed and encrypted. The encrypted sum is provided to a database server.

Additional aspects of the invention will be set forth, in part, in the detailed description, figures and any claims which follow, and in part will be derived from the detailed description, or can be learned by practice of the invention. It is to be understood that both the foregoing general description and the following detailed description are examples and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein:

as shown in FIG. 1;

DETAILED DESCRIPTION

The disclosure is directed to, e.g. secure retrieval of database records by a server. In some conventional secure database systems, a database server is implemented as two noncolluding entities, a server S and an index server IS. In such systems the server is the owner of the database. The index server may be regarded as, e.g., an auxiliary noncolluding server. During a setup phase, the server encrypts each row of the database and sends the encryptions to the index server. When a client C queries the encrypted database held by the index server, the index server responds with the correct (encrypted) row, and asks the server to send to the client the decryption key. However, because the server knows the key sent to the client, the client query is not strictly private, possibly providing a malicious entity an opportunity to intercept the query data.

Some attempts to improve security of such conventional systems require computational resources that may be costly or even prohibitive. For example one proposed solution uses a matrix of homomorphic encryptions of size $n^2$, where n is the number of database records. In such implementations, the index server re-encrypts each of the n records with a new key, requiring $n^2$ encryption operations. For more than a modest number of database records, such a solution may exceed the practical computational limitations of the database system. Thus there is a need for alternative solutions.

The inventor has discovered that security of queries in secure database systems may be improved by, e.g., assigning and manipulating decryption keys in a setup phase as disclosed in embodiments described herein. Briefly summarizing, without limitation, in one embodiment a server provides to a noncolluding index server a permuted and encrypted database and a corresponding array of encryption/decryption keys. Herein a noncolluding server is defined as an auxiliary server that stores and searches the encrypted database. A client queries the index server for a database record. The index server returns the requested record to the client in encrypted form, along with the corresponding decryption key and a corresponding mask value. The client then adds the mask value to the key, encrypts the sum and sends it to the server. The server then returns the unencrypted masked key, with which the client decrypts the encrypted record previously received from the index server. Only the client has sufficient information to determine the value of the requested database record. The query is hidden from the index server because the index server possesses a permuted copy of the encrypted database. Thus the index server does not know which record of the unpermuted database is returned. The server also does not know which record of the unpermuted database is returned because the key the server returns is masked. Thus the server cannot correlate the masked key with the key used by the server to encrypt a particular row of the database. The secure database system may thereby provide secure retrieval of the record. Moreover, described embodiments service a database query in time proportional to n. In a database that includes 1E8 records, embodiments of the invention may therefore provide an efficiency increase of $n^2/n$, or 1E8 in the present example.

Figure 1:
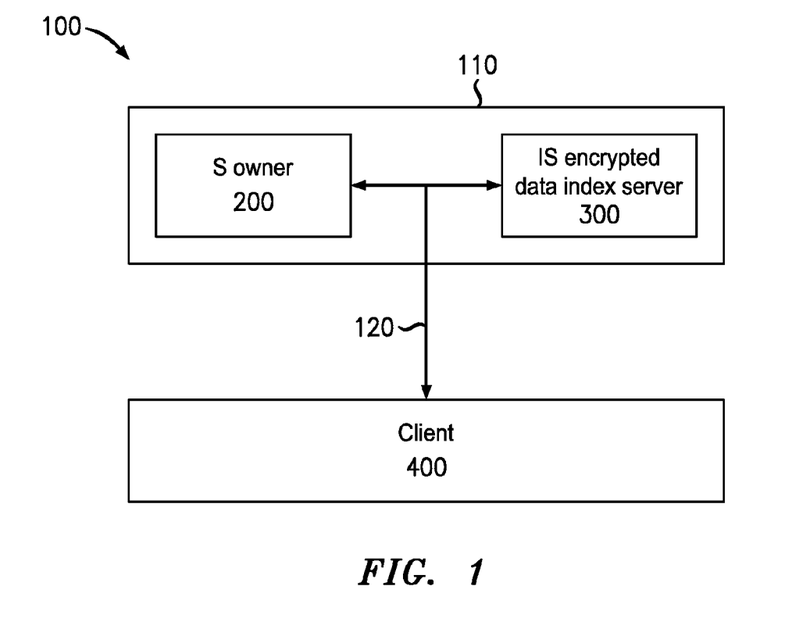
FIG. 1 illustrates a database system including communication a server (S), an index server (IS) and a client (C) coupled via a communication network.

FIG. 1 illustrates a system 100 according to one nonlimiting embodiment that may operate, e.g. to provide secure storage and retrieval of data. The system 100 includes a system 110 that in turn includes a server (S) 200 and an index server (IS) 300. A client (C) 400 may communicate with the system 110 to retrieve database entries. Communication between the client 400, server 200 and index server 300 may be via a network 120. The network 120 may be any combination of wired, wireless, or optical connections, e.g. the Internet. The server 200 and the index server 300 may be physically collocated or remote from each other. In some embodiments the server 200, index server 300 and client 400 communicate via the Internet.

Figure 2:
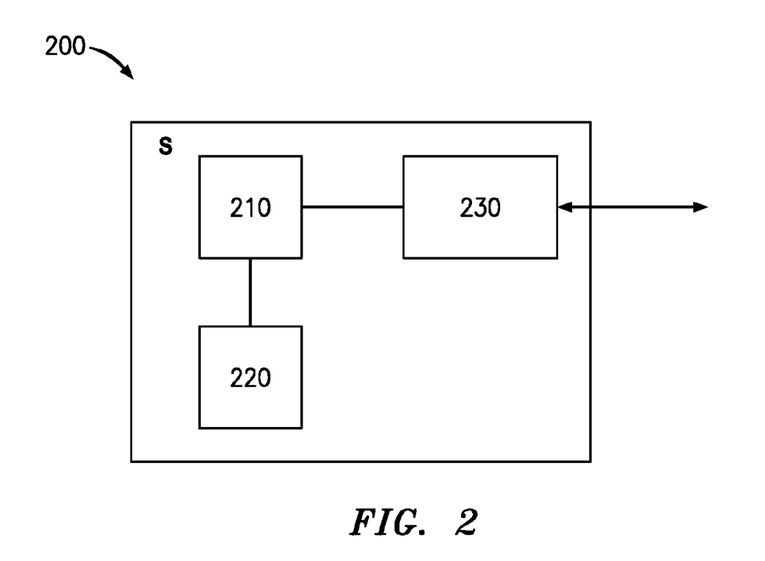
FIGS. 2-4 respectively illustrate functional blocks of the server, index server and client, e.g.

FIG. 2 illustrates one example embodiment of the server 200. The server 200 includes a processor (CPU) 210, a memory 220 and a network interface 230. The memory 220 may include any combination of, e.g., RAM, ROM and disc storage to support the functions described herein. The memory 220 may include instructions accessible to and executed by the processor 210. The memory 220 may also include database records, e.g. an array of data entries that may be provided upon request to the client 400. The memory 220 may include, e.g. 100 GB or more of RAM to support the database functions. The network interface 230 may include functionality to communicate with the index server 300 and the client 400. For example the network interface 230 may be configured to communicate via the network 120 by TCP/IP or a similar standard.

Figure 3:
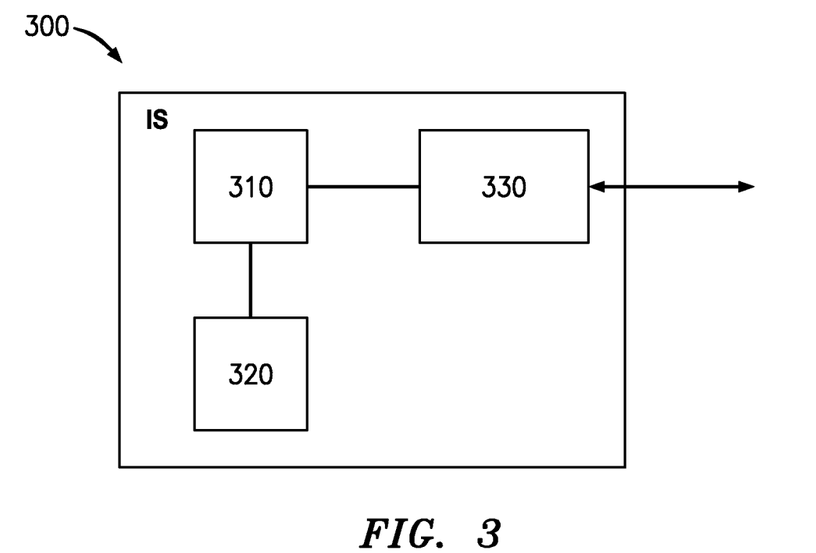

FIG. 3 illustrates one example embodiment of the index server 300. The index server 300 may include functional blocks similar to those described for the server 200. For example, the index server 300 may include a processor 310, a memory 320 and a network interface 330. The memory 320 includes instructions accessible to and executable by the processor 310, as well as memory space to accommodate various data structures described below and data access requests by the client 400.

Figure 4:
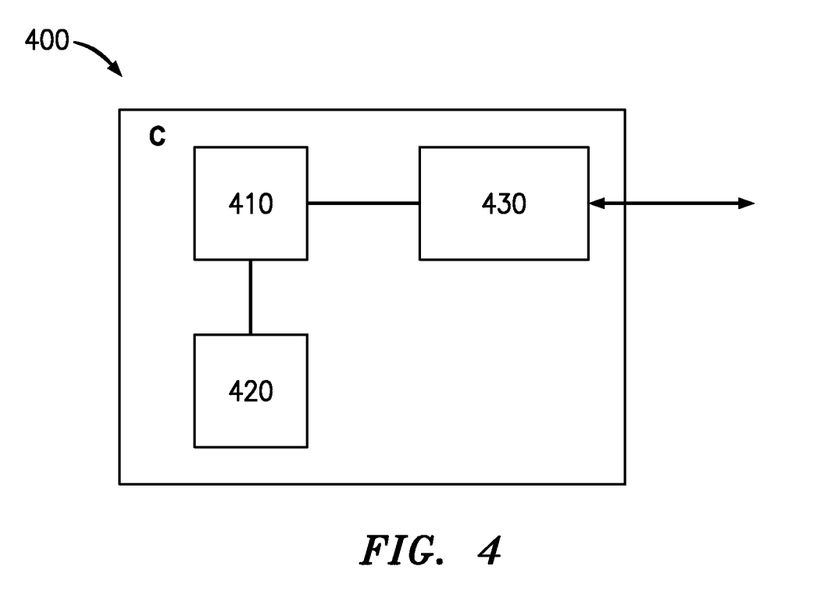

FIG. 4 illustrates an embodiment of the client 400. The client 400 may again include functional blocks similar to those of the server 200 and index server 300, e.g. a processor 410, a memory 420 and a network interface 430. The memory 220 includes instructions accessible to and executable by the processor 400. The client 400 may be, e.g. a personal computer, mobile computing device (e.g. an iPad®), a smart phone, a work station, or a mainframe computer system.

Figure 5:
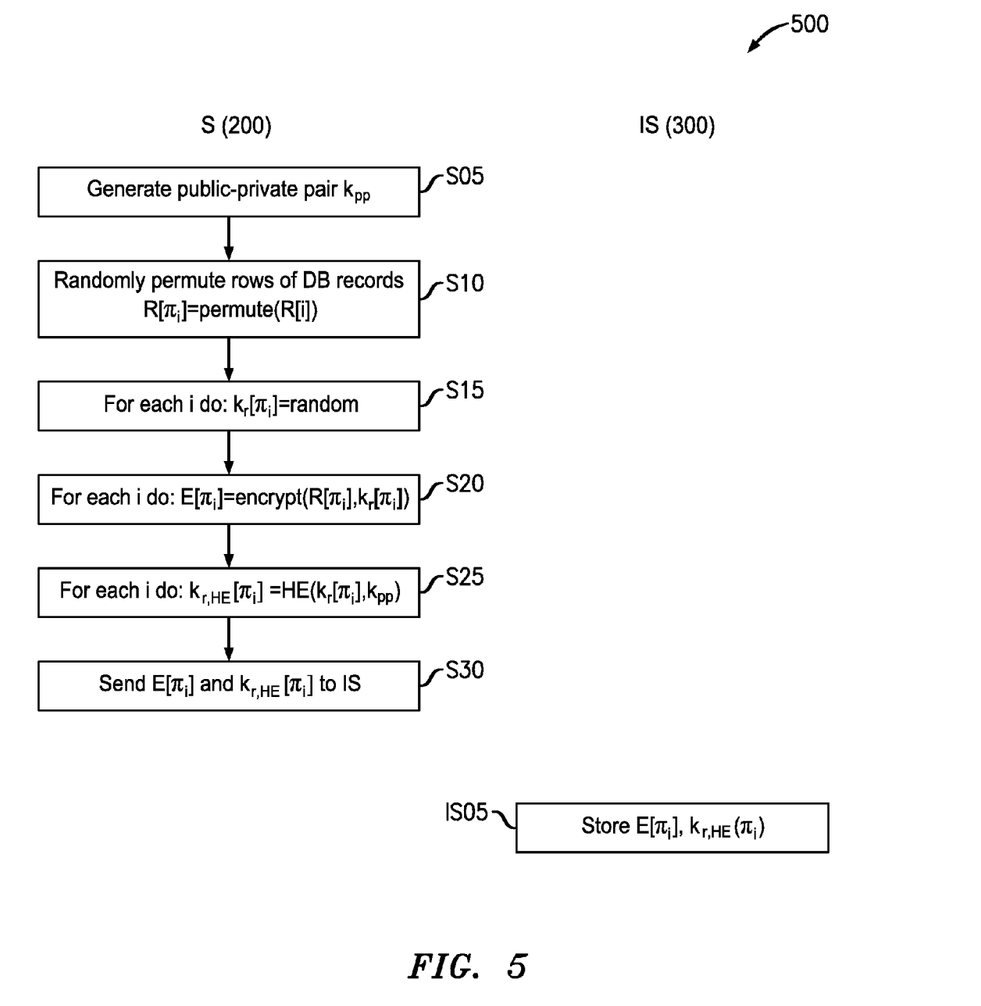
FIG. 5 illustrates in one embodiment operation of the server and index server of FIG. 1, e.g. for setting up the server and index server of FIG. 1 to securely provide data to the client in response to a query.

FIG. 5 illustrates in a first embodiment aspects of initialization of the server 200 and the index server 300 to provide secure data retrieval to the client 400. A method 500 of initializing the database begins with a step S05, in which the server 200 generates a public-private key pair $k_{pp}$ and sends the public key to the client 400. The server 200 is assumed to already include a database of records R[i]=R[1], R[2], R[3], . . . . In a step S10, the server 200 at least pseudorandomly permutes the order of the database records to produce a permuted database $R[\pi_i]$. In other words, the records R[i] of the database array are mapped to a new database array in which the record index i is replaced with a permuted index $\pi_i$ selected at least pseudorandomly from among the set of {i}. Herein, the term "at least pseudorandomly" reflects the understanding that computational methods of generating "random" values inherently include some level of determination, but may be effectively indistinguishable from randomly generated values. Hereinafter, computations and numerical sets may be described without limitation as "random" while recognizing these computations or sets may be only pseudo-random.

In a step S15, the server 200 generates a random key array $k_r[\pi_i]$. This array includes a random key value, $k_r$, associated with each record of the permuted database $R[n_r]$. In a step S20, the server 200 generates an encrypted database array $E[\pi_i]$ by encrypting each value of $R[\pi_i]$ using its associated key value $k_r[\pi_i]$. In a step S25, the server 200 encrypts each member of $k_r[\pi_i]$ using the public key of the key pair $k_{pp}$ to produce an encrypted key array. In a preferred embodiment, the encryption is homomorphic. An example of homomorphic encryption (HE) is the Paillier cryptosystem. The utility of HE in various embodiments is described below. The encrypted key array is referred to without limitation to reflect this embodiment as $k_{r,HE}[\pi_i]$. In a step S30 the server 200 transfers the encrypted database array $E[\pi_i]$ and the encrypted key array $k_{r,HE}[\pi_i]$ to the index server 300. In a step IS05, the index server 300 stores the arrays $E[\pi_i]$ and $k_{r,HE}[\pi_i]$.

Upon completion of the step IS05, the setup phase of the system 100 is complete. Because of the described operations used to generate $E[\pi_i]$, the server 200 does not have sufficient information to determine the contents of the $E[\pi_i]$ array. More specifically, the R[i] database array stored by the server 200 is indexed differently than the $E[\pi_i]$ array stored by the index server 300, so that the relationship between these arrays is hidden from each of the server 200 and the index server 300. However, as described below the client 400 may determine the value of an encrypted database record using information known only to it, thus providing greater security of the system 100 relative to secure conventional database systems.

Figure 6:
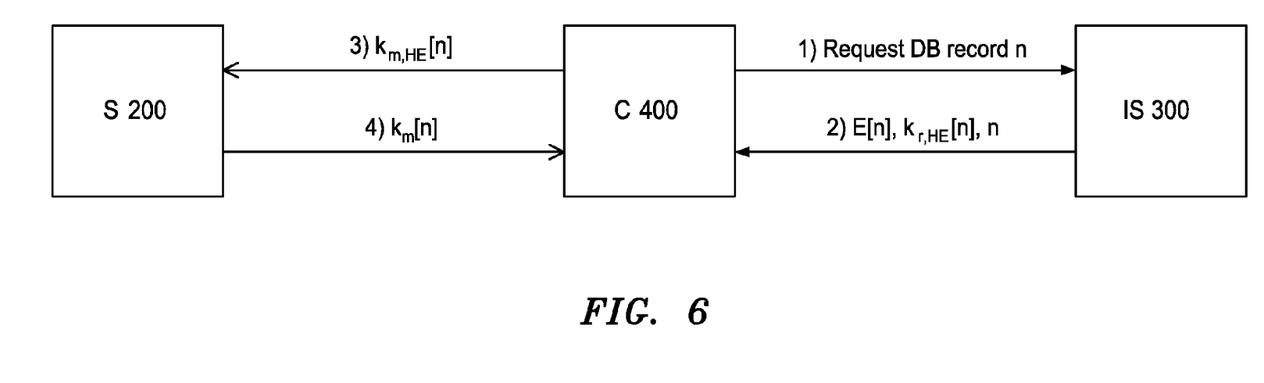
FIGS. 6 and 7 illustrate in a first embodiment operation of the server, index server and client of FIG. 1, e.g., to securely provide data to the client.
Figure 7:
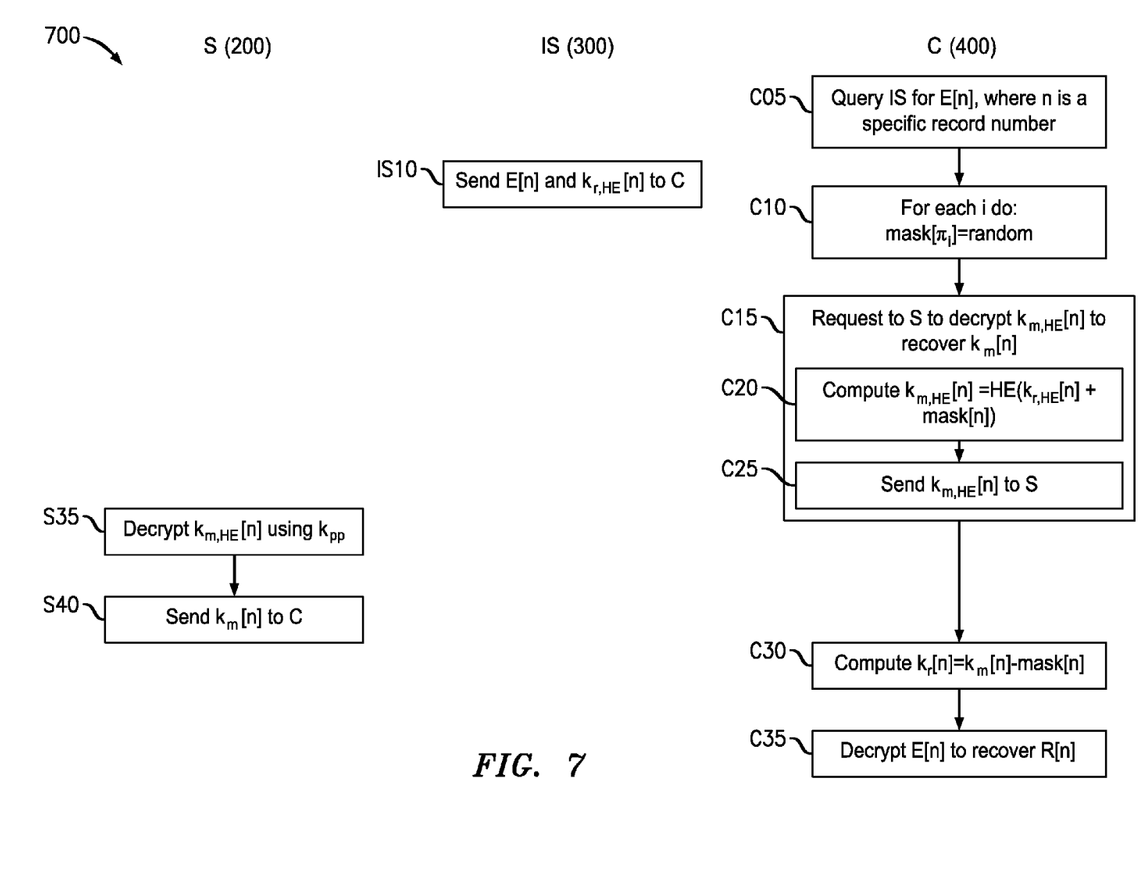

Referring now to FIGS. 6 and 7, a first embodiment of secure retrieval of data from the system 100 by the client 400 is described. FIG. 6 provides a high-level description of the exchange of information between the client 400 and the server 200, and of the exchange of information between the client 400 and the index server 300. FIG. 7 presents a method 700 that provides a more detailed description of operations performed by the server 200, index server 300 and client 400 in response to a database query in the present embodiment.

Referring to FIG. 7, in a step C05 the client 400 sends a query to index server 300 for a specific record n. This step corresponds in FIG. 6 to a first communication from the client 400 to the index server 300. In response to the query, in a step IS10 (FIG. 7), the index server sends E[n] and $k_{r,HE}[n]$ to the client 400. This step corresponds in FIG. 6 to a second communication from the index server 300 to the client 400.

With continued reference to FIG. 7, in a step C10 the client 400 generates a random mask value for each entry of the permuted database. In a step C15 the client 400 forms a request to the server 200 to decrypt the key $k_r[n]$. But to prevent server 200 from determining the key value, the client 400 first masks the value of the key by adding a corresponding mask value generated in the step C10. This is possible due to the homomorphic encryption of the key value in the step S10 (FIG. 5). Thus, in a first sub-step C20 the client 400 performs a homomorphic encryption of the sum of $k_{r,HE}[n]$ and mask[n] using the public key previously received from the server 200. As understood by those skilled in the pertinent art, the properties of homomorphic encryption make it possible to add an offset such as mask[n] to the encrypted $k_{r,HE}[n]$ value and encrypt the result such that the $k_r[n]$ value may be later recovered by subtracting mask[n] without first decrypting the encrypted sum, e.g. in a step C30 described below. In a sub-step C25 the client 400 transmits $k_{m,HE}[n]$ to the server 200. This step corresponds in FIG. 6 to the third communication from the client 400 to the server 200.

The transmission of the $k_{m,HE}[n]$ value serves to initiate a request to the server 200 to decrypt $K_{r,HE}[n]$ to produce the masked key $k_m[n]$. In a step S35 (FIG. 7) the server 200 decrypts $k_{m,HE}[n]$ using $k_{pp}$, e.g. the private key of $k_{pp}$, to recover $k_m[n]$. Because this value is still masked the server 200 has no knowledge of the value of the corresponding $k_r[n]$. In a step S40 the server 200 sends $k_m[n]$ to the client 200. This step is shown as the fourth communication in FIG. 6 from the server 200 to the client 400.

In a step C30 (FIG. 7) the client 400 subtracts mask[n] from $k_m[n]$, thereby recovering $k_r[n]$. In a step C35 the client 400 decrypts E[n] using $k_r[n]$ to obtain R[n].

In the preceding embodiment, because only the client 400 possesses the encrypted data E[n] and the mask[n] value, only the client is able to recover the value $k_r[n]$ needed to decrypt E[n]. Moreover, the permutation of the $R[\pi_i]$ array from the R[i] array ensures that server 200 is not able to determine the database record that the client 400 is attempting to recover. In this manner, the client 400 is able to recover the value of R[n] securely, e.g. without the server 200 or the index server 300 being able to determine the data retrieved by the client 400.

Figure 8:
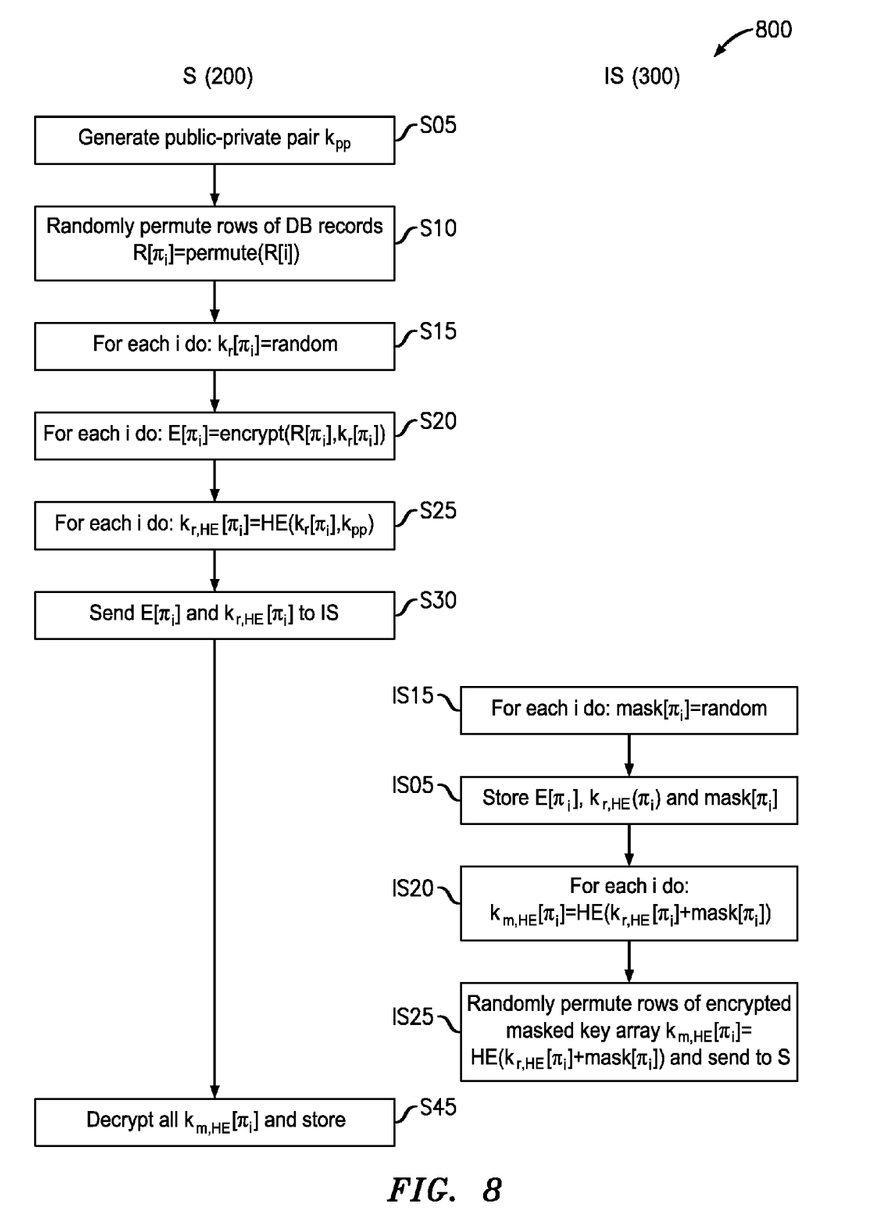
FIG. 8 illustrates in another embodiment operation of the server and index server of FIG. 1, e.g. for setting up the server and index server of FIG. 1.
Figure 9:
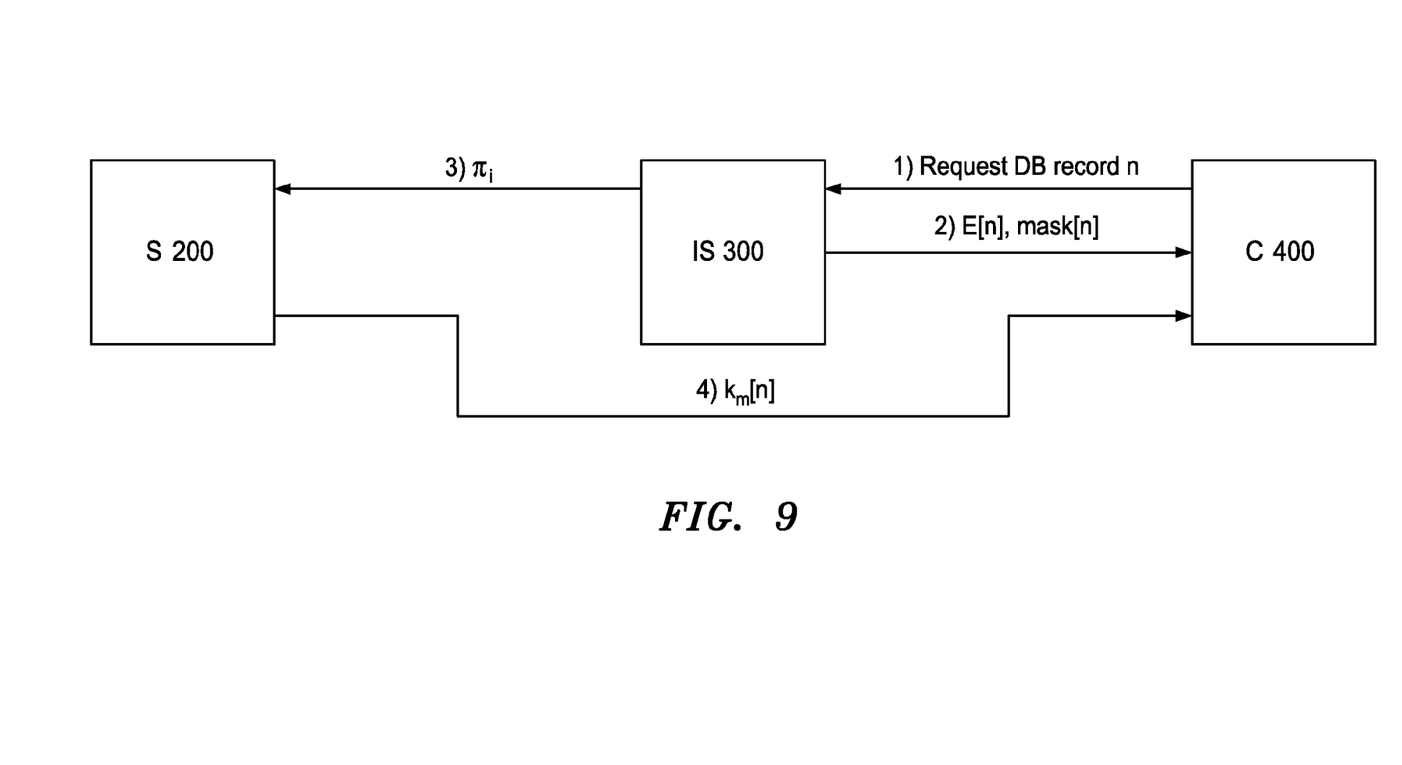
FIGS. 9 and 10 illustrate in a second embodiment operation of the server, index server and client of FIG. 1, e.g., to securely provide data to the client.
Figure 10:
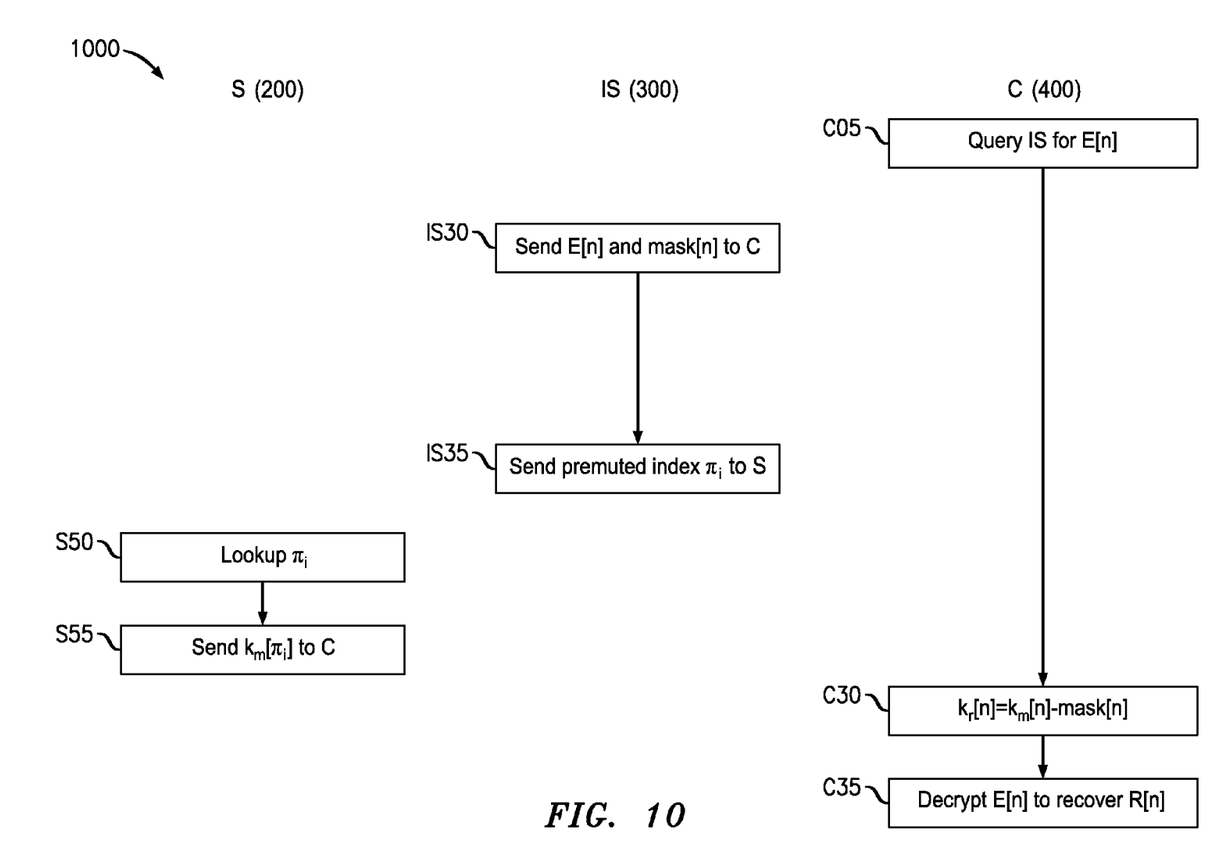

FIGS. 8-10 present a second embodiment of operation of the system 100. FIG. 8 provides a method 800 that describes an alternative to the embodiment of the database setup method 500 shown in FIG. 5. FIGS. 9 and 10 respectively provide a high-level and a detailed description of a method 1000. In this embodiment, it is the index server 300 that performs the homomorphic operations previously performed by the client 400 in the method 700. Such operation may reduce the time required by the client 400 to be online with the server 200 and the index server 300, but sometimes at the expense of additional offline processing.

Referring to FIG. 8, steps S05-S30 and IS05 are as described previously with respect to FIG. 5. The method 800 provides prior to the step IS05 a step IS15 in which the index server 300 generates a random mask value mask[$\pi_i$] corresponding to each database record, e.g. as described previously with respect to step C10 (FIG. 7). In the step IS05 the index server 300 as previously described stores the arrays $E[\pi_1]$ and $k_{r,HE}[\pi_1]$. In a step 1S20, the index server 300 computes for each database record the homomorphic encryption of the sum of $k_{r,HE}[\pi_i]$ (e.g. using the public key of $k_{pp}$) and mask[$\pi_i$] using the public key of $k_{pp}$, the sum being designated $k_{m,HE}[\pi_1]$. In a step 1S25 the index server 300 randomly permutes the order of $k_{m,HE}[\pi_1]$ and sends the permuted array of values to the server 200. In a step S45 the server 200 decrypts the permuted mask array using the private key of $k_{pp}$, and stores the resulting values.

Referring to FIG. 10, the method 1000 includes the previously described step C05, in which the client 400 queries the index server 300 for encrypted record n. This query is shown in FIG. 9 as a first communication from the client 400 to the index server 300. The index server 300 in a step IS30 sends E[n] and mask[n] to the client 400. This step corresponds to the second communication in FIG. 9 between the client 400 and the index server 300. In a step IS35, the index server 300 sends the permuted index Tr, to the server 200. This step corresponds to the third communication in FIG. 9 from the index server 300 to the server 200. In a step S50 the server 200 associates the permuted index with the corresponding value of the permuted mask array and in a step S55 sends the corresponding value $k_m[\pi_i]$ to the client 400. This transmission is shown in FIG. 9 as a fourth communication from the server 200 to the client 400. As previously described in a step C30 the client 400 subtracts mask[n] from $k_m[n]$, thereby recovering $k_r[n]$, and in a step C35 the client 400 decrypts E[n] using $k_r[n]$ to obtain R[n].

Note that in the described embodiments the operation of the server 200, index server 300 and the client 400 are not limited to the described order. In other embodiments the steps of the described operations may be in another order, or may be combined or separated. In some embodiments some illustrated steps may be removed, or others added, without departing from the scope of the disclosure.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A database server, comprising:
a processor;
a memory accessible by the processor and including a plurality of database records,
wherein the processor is configured to:
at least pseudorandomly permute the order of the database records, thereby producing a permuted database;
generate an at least pseudorandom encryption key corresponding to each permuted database record, thereby producing an encryption key array;
encrypt each permuted database record using a corresponding encryption key of the encryption key array, thereby producing an encrypted database array;
encrypt each encryption key of the encryption key array, thereby producing an encrypted encryption key array;
direct the encrypted database array and the encrypted encryption key array toward an index server;
decrypt and store a masked encryption key array received from the index server, the masked encryption key array being derived from the encrypted encryption key array; and
use a public-private key pair to decrypt a specified encrypted masked encryption key of the masked encryption key array in response to receiving the specified encrypted masked encryption key from a client server, and to direct a resulting decrypted masked key toward the client server.

2. The server of claim 1, further comprising a network interface configured to provide communication over a network between the processor, the index server and a client server.

3. The server of claim 1, wherein the processor is further configured to generate a public-private key pair, and to homomorphically encrypt each of the pseudorandom encryption keys of the encryption key array using the public-private key pair.

4. A database index server, comprising:
a processor;
a memory accessible by the processor and including program instructions executable by the processor to:
receive a key array of encrypted encryption keys;
generate a mask array including at least pseudorandom masks, each pseudorandom mask corresponding to a member of the key array; and
compute for each encryption key of the key array a sum of that encryption key and the corresponding mask;
homomorphically encrypt each sum, thereby producing an array of encrypted masked keys; and
at least pseudorandomly permute the order of the encrypted sums to produce a permuted array of masked encrypted keys, and to direct the permuted array of masked encrypted keys toward the database server.

5. The index server of claim 4, wherein the processor is further configured to receive an array of data records from a database server and a record number from a client server, and in response to return to the client server a data record and a mask corresponding to the record number.

6. The index server of claim 4, wherein the processor is further configured to direct a permuted database index toward the server to access a corresponding member of the permuted array of masked encrypted keys.

7. The index server of claim 6, wherein each record of the array of data records is encrypted.

8. A method of operating a database server, comprising:
at least pseudorandomly permuting the order of database records stored by the server;
generating an at least pseudorandom encryption key corresponding to each permuted database record, thereby producing an encryption key array;
encrypting each permuted database record using a corresponding encryption key of the encryption key array, thereby producing an encrypted database array;
encrypting each encryption key of the encryption key array, thereby producing an encrypted encryption key array;
directing the encrypted database array and the encrypted encryption key array toward an index server;
decrypting and storing a masked encryption key array received from the index server, the masked encryption key array being derived from the encrypted encryption key array;
using a public-private key pair to decrypt a specified encrypted masked encryption key of the masked encryption key array in response to receiving the specified encrypted masked encryption key from the client server, and directing a resulting decrypted masked key toward the client server.

9. The method of claim 8, further comprising generating a public-private key pair and homomorphically encrypting each of the pseudorandom encryption keys using the public-private key pair.

10. A method of operating a database index server, comprising:
receiving an array of encryption keys;
generating a mask array including a plurality of at least pseudorandom masks, each at least pseudorandom mask corresponding to a member of the key array;
computing and homomorphically encrypting a sum of each encryption key and the at least pseudorandom mask corresponding to that key;
encrypting each sum, thereby producing an array of encrypted masked keys; and
at least pseudorandomly permuting the order of the encrypted sums to produce a permuted array of masked encrypted keys, and directing the permuted array of masked encrypted keys toward the database server.

11. The method of claim 10, further comprising receiving an array of data records from a database server and a record number from a client server, and in response returning to the client server a data record and a mask corresponding to the record number.

12. The method of claim 11, wherein each record of the array of data records is encrypted.

13. The method of claim 10, further comprising directing a permuted database index toward the server to access a corresponding member of the permuted array of masked encrypted keys.

\* \* \* \* \*